June 28, 1938.  A. W. LAIRD  2,121,969
MOLD
Filed Sept. 5, 1936

INVENTOR
*A.W. LAIRD*
BY *H. Q. Whitehorn*
ATTORNEY

Patented June 28, 1938

2,121,969

UNITED STATES PATENT OFFICE 2,121,969

MOLD

Alfred W. Laird, Chicago, Ill., assignor to Western Electric Company, Incorporated, New York, N. Y., a corporation of New York Application September 5, 1936, Serial No. 99,549

6 Claims. (Cl. 22—188)

This invention relates to molds, and more particularly to molds for casting high melting point materials.

Certain articles made of palladium and other expensive metals and alloys of the platinum group are cast into shape or machined from special billets to conserve material. Scrap produced in machining operations is carefully melted into billets and reused. Production of accurate and uncontaminated castings and billets from these metals has been hampered by lack of an entirely suitable casting mold. Generally used mold materials, such as plaster of Paris, do not withstand the high temperatures required to melt the platinum group metals. Freshly burned lime has been used for this purpose but due to its tendency to combine with moisture and carbon dioxide in the air, special and costly processes are required for the manufacture and use of molds made from this material.

An object of this invention is to provide an improved, serviceable and inexpensive mold for casting high melting point materials.

In accordance with one embodiment of the invention there is provided a mold comprising fused magnesium oxide and hydrated calcium oxide, thoroughly mixed and pressed in dry form under high pressure into a body having a cavity for the metal to be cast.

Figure 1:
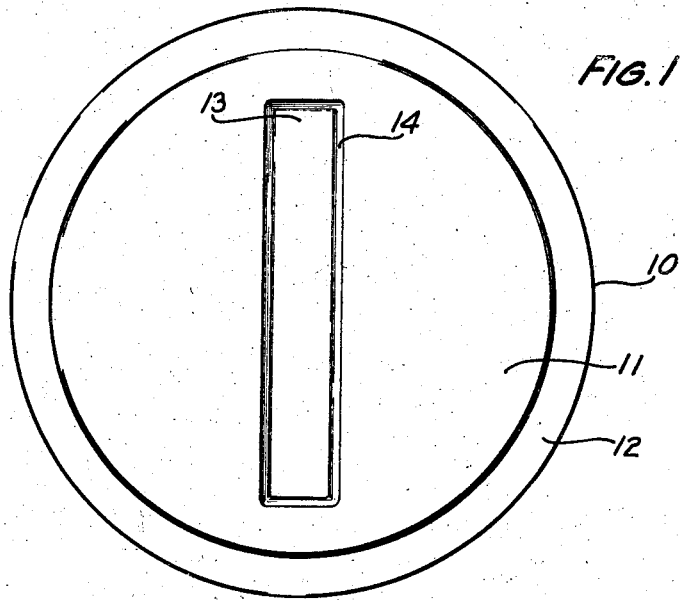
Figure 2:
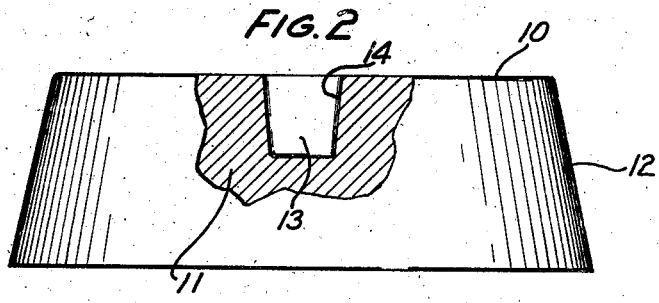

A complete understanding of the invention may be had from the following detailed description, taken in conjunction with the appended drawing, in which Fig. 1 is a plan view of a casting mold embodying the invention, and Fig. 2 is an elevation, partly in section, of the mold shown in Fig. 1.

The mold 10 shown in the drawing is suitable for casting billets. It has a disk-shaped body 11 with tapered sides 12 to facilitate manufacture. A recess or cavity 13 in the top surface of the body is formed with sloping sides 14 or other contour desired for the completed billet.

In the first operation in the manufacture of the mold fused magnesium oxide ground to a prescribed particle size and powdered hydrated calcium oxide are mixed in the proper proportions in a tumbling barrel or by other suitable means to coat the calcium powder on the magnesium particles.

Commercial hydrated calcium oxide, which is supplied in the form of fine powder, can be used satisfactorily and fused magnesium oxide having suitable characteristics is available commercially as "Periclase".

The fused magnesium oxide is ground sufficiently fine to pass through a 10 mesh screen before mixing. The hydrated calcium oxide functions as a binder in the mixture and the exact proportion required is determined by the particle size distribution of the magnesium oxide as measured by a screen analysis. A satisfactory mixture includes 25% calcium oxide and 75% magnesium oxide which in an analysis is retained 23% on a 20 mesh screen, 47% on a 40 mesh screen, 14% on a 60 mesh screen, with the remainder of 16% passing through the 60 mesh screen. Another successful mixture comprises 30% calcium oxide and 70% magnesium oxide which will analyze with 35% retained on a 20 mesh screen, 25% on a 40 mesh screen, 15% on a 60 mesh screen, and 25% passing through the 60 mesh screen.

The necessity for a higher proportion of binder for the latter mixture is apparently due to an an increase in total particle surface of the magnesium oxide. It is desirable to coat the magnesium oxide particles completely and to avoid an excess of binder which tends to weaken the structure in service. Consequently, further variations in particle size distribution will require accommodating adjustments in ingredient proportions. For a very fine magnesium oxide a 50—50 mixture may be indicated and, similarly, for a coarser material the quantity of binder may be reduced to 15%.

The two mixtures described above in which 25% or 30% of binder are used give the best results and the particle size distribution of the magnesium oxide in either of these mixtures can be maintained consistently by duplication and control of the grinding operation.

After the ingredients have been combined, the mixture, without additions, is pressed into a mold of the desired size and shape. This operation is conveniently performed in a cavity die on a conventional hydraulic or mechanical press. Substantial forming pressures are required and values around 8000 pounds per square inch are satisfactory. The tapered sides of the mold facilitate its removal from the die after pressing.

The molds can be manufactured conveniently and economically. As the material is not subject to air contamination the mixture is prepared and pressed into molds in quantities suitable for most efficient manufacture and the completed molds can be carried in storage until needed without deterioration.

Before use the mold is heated gradually to a temperature of approximately 1500° F. in an oven or with a torch to eliminate contained moisture and condition the mold for service. Gradual application of the heat prevents spalling due to spontaneous generation of steam under the surface of the mold. Elimination of moisture from the mold changes the original ingredient proportions. A mold made from 75-25 mixture and heated contains approximately 80% magnesium oxide and 20% calcium oxide and a mold pressed from the 70-30 mixture will contain approximately 75% magnesium oxide and 25% calcium oxide when ready for use.

The form of mold shown in the attached drawing is particularly suitable for melting palladium or platinum scrap. The scrap is placed in the cavity in the top of the hot mold and melted to form the billet with a torch or in a furnace. When a torch is used the flame is played over the mold surface periodically during the melting to prevent wide discrepancies between the metal and mold temperatures.

After the metal is cooled the mold can be removed readily from the billet by breaking it with a hammer. The mold material is embrittled by the melting operation and does not adhere to the billet which avoids contamination of the cast metal.

The open cavity in the mold face can be formed to any desired contour and a fully enclosed cavity can be provided by joining two cooperating mold portions having a gate for the introduction of molten metal.

Other modifications and adaptations of the methods and article described above are feasible and it is to be understood that the invention is limited only by the scope of the appended claims.

What is claimed is:

1. A mold for casting high melting point materials, consisting of from 50% to 85% fused magnesium oxide and respectively from 50% to 15% calcium oxide.

2. A casting mold for high melting point materials consisting of approximately 75% fused magnesium oxide and approximately 25% calcium oxide.

3. A casting mold for high melting point materials consisting of approximately 80% fused magnesium oxide and 20% calcium oxide.

4. A mixture for casting molds suitable for high temperature metals, consisting of from 50% to 85% fused magnesium oxide and respectively from 50% to 15% hydrated calcium oxide.

5. A method of making a casting mold for high melting point materials which comprises tumbling a mixture consisting of from 50% to 85% ground fused magnesium oxide and the remainder hydrated calcium oxide to coat the calcium oxide on the ground magnesium oxide particles, and pressing the tumbled mixture into the form of a mold.

6. A method of making a casting mold for high melting point materials which comprises preparing a mixture consisting of from 50% to 85% ground fused magnesium oxide and the remainder calcium hydroxide; pressing the mixture into a shaped mass, and heating the shaped mass to convert the calcium hydroxide to calcium oxide.

ALFRED W. LAIRD.